United States Patent
Goodman et al.

(10) Patent No.: US 8,417,227 B2
(45) Date of Patent: Apr. 9, 2013

(54) VIRTUALIZED MOBILE COMMUNICATION DEVICE

(75) Inventors: Lee Goodman, Tyngsboro, MA (US); Robert H. Liao, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 950 days.

(21) Appl. No.: 12/197,496

(22) Filed: Aug. 25, 2008

(65) Prior Publication Data

US 2010/0048183 A1 Feb. 25, 2010

(51) Int. Cl.
*H04M 3/42* (2006.01)

(52) U.S. Cl. .................. 455/414.1; 455/418; 455/419; 455/550.1

(58) Field of Classification Search ............... 455/414.1, 455/418, 419, 420, 550.1; 370/338, 352, 370/401
See application file for complete search history.

(56) References Cited

U.S. PATENT DOCUMENTS

| | | | |
|---|---|---|---|
| 2005/0220080 A1* | 10/2005 | Ronkainen et al. | 370/352 |
| 2006/0291433 A1* | 12/2006 | Do et al. | 370/338 |
| 2007/0254637 A1* | 11/2007 | Plant et al. | 455/418 |
| 2008/0159305 A1* | 7/2008 | Morris et al. | 370/401 |

* cited by examiner

*Primary Examiner* — Kathy Wang-Hurst (57) ABSTRACT

Virtual handsets may be defined and downloaded to physical devices when desired. The use of virtual handsets may allow a user to have multiple different physical handsets or other devices, all of which can present a relatively consistent interface to the user. In one particular implementation, a profiles may be stored that define personal preference and usage information for the virtual handset. The profile may be downloaded a physical handset for implementation of a user interface at the physical handset based on the personal preference and usage information of the profile.

22 Claims, 9 Drawing Sheets

VIRTUALIZED MOBILE COMMUNICATION DEVICE

BACKGROUND INFORMATION

The proliferation of portable communication devices, such as mobile phones, has grown tremendously within the past decade. In addition to voice conversations, mobile phones offer a number of additional features to their users, such as text messaging, multimedia playback, and video conferencing.

Increasingly, consumers may use more than one mobile phone. For example, a business person may use one mobile phone for work related matters and another one for personal matters. Some consumers may carry different mobile phones for different social occasions, or even carry different mobile phones designed to match the clothing being worn. Additionally, some people may use different mobile phones to compensate for a lack of wireless phone service in certain areas.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein allow customers to define a "virtual handset" that embodies personal preference and/or usage information for one or more mobile communication devices ("handsets"). The customer may, at various times, use multiple physical handsets. The virtual handset may be stored in a network and may be dynamically downloaded to a physical handset being used by the customer. The virtual handset may allow different physical handsets to present a relatively consistent interface to the customer.

The term "handset" will be used herein to refer to portable communication devices. Such devices may include, but are not limited to, a cellular or mobile phone, a personal digital assistant (PDA), or a laptop computer.

Figure 1:
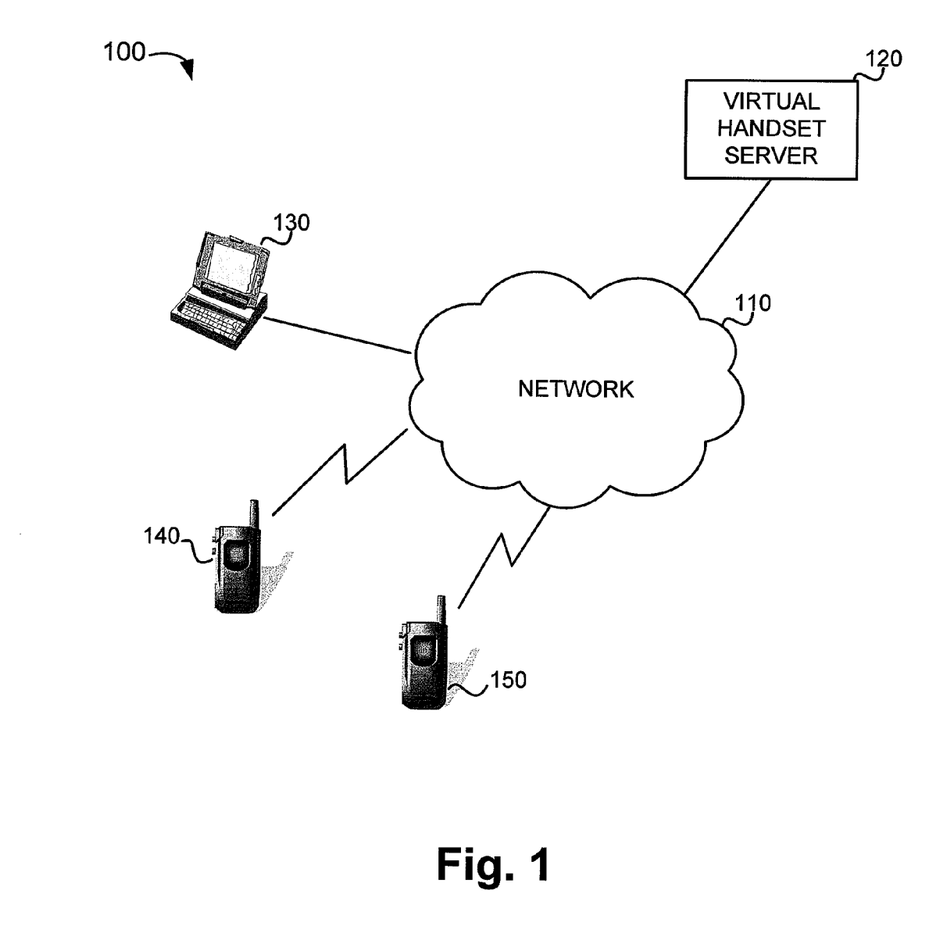
FIG. 1 is a diagram of an exemplary system in which concepts described herein may be implemented.

FIG. 1 is a diagram of an exemplary system 100 in which concepts described herein may be implemented. As illustrated, system 100 may include a network 110 that connects various computing devices to one another. For purposes of illustration, FIG. 1 depicts a virtual handset server 120 connected to three communication/computing devices 130, 140 and 150. In other implementations, more or fewer communication/computing devices may be connected to virtual handset server 120.

Network 110 may include a Local Area Network (LAN); a wide area network (WAN), such as a cellular network, a satellite network, or the Internet; a private WAN; a combination of the Internet and a private WAN; or a combination of any of the above types of networks (or other types of networks not described); that is used to transport data. Although shown as a single element in FIG. 1, network 110 may include a number of separate networks that function to provide services to virtual handset server 120 and user devices 130, 140, and 150.

Virtual handset server 120 may include one or more servers or other network devices used to deliver or control delivery of services to users' of devices 130, 140, and 150. Although shown as a single element in FIG. 1, in some implementations, virtual handset server 120 may be implemented as multiple, physically distributed servers. In general, virtual handset server 120 may store and manage virtual handsets that may be implemented at user devices 130, 140, and 150. Virtual handset server 120 will be described in more detail below. In general, a "virtual handset," as this term is used herein, refers to a information, such as personal preference and/or usage information, that defines an interface and/or user data that a physical handset would normally provide to a user. A virtual handset, however, may not be tied to any particular physical handset. The type of information that may be embodied by a virtual handset will be described in more detail below.

Users may connect with and communicate through network 110 using a number of different types of communication/computing devices 130, 140, and 150. As shown in FIG. 1, devices 130, 140, and 150 may particularly include handsets 140 and 150 and a personal computer 130 (illustrated as a portable computer).

In general, communication/computing devices 130, 140, and 150 may include any type of communication or computing device, for example, a digital landline telephone, a mobile phone, or a personal computer, such as desktop, laptop computer, or personal digital assistant (PDA).

Figure 2:
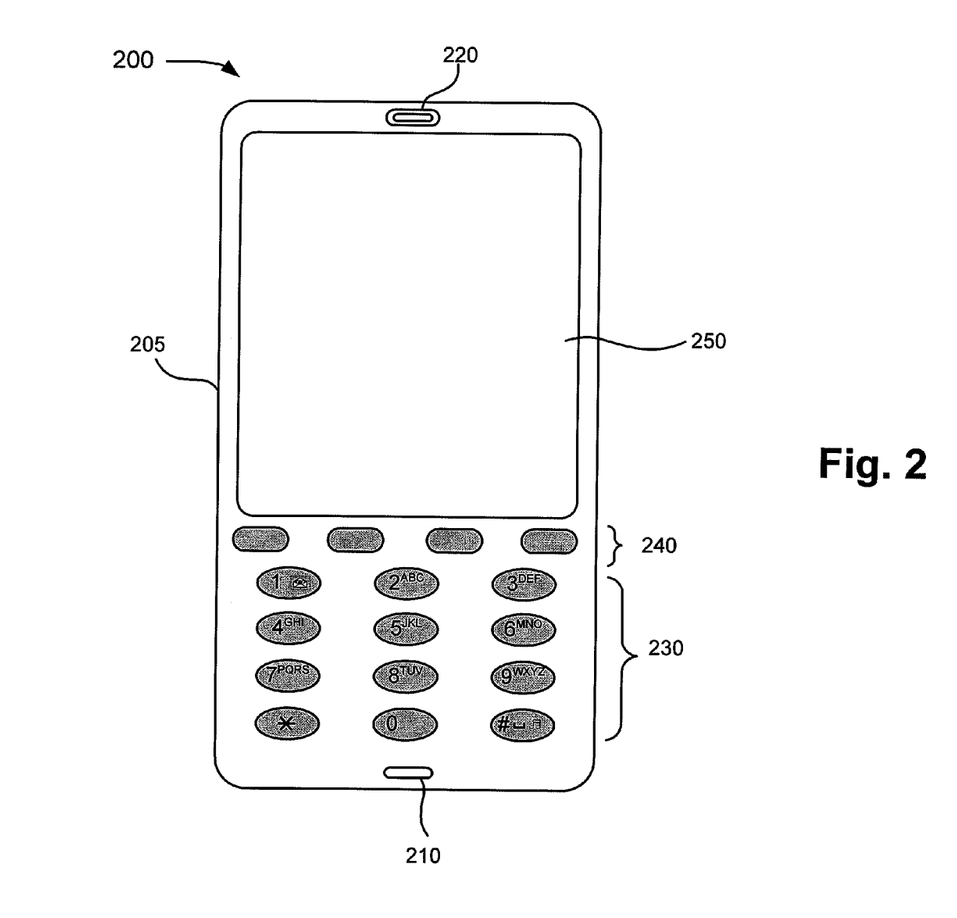
FIG. 2 is a diagram illustrating a front view of exemplary external components of a mobile communication handset.

FIG. 2 is a diagram illustrating a front view of exemplary external components of a handset 200, such as handset 140 or 150. As illustrated, handset 200 may include a housing 205, a microphone 210, a speaker 220, a keypad 230, function keys 240, and a display 250.

Housing 205 may include a structure configured to contain components of handset 200. For example, housing 205 may be formed from plastic and may be configured to support microphone 210, speaker 220, keypad 230, function keys 240, and display 250.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound waves. For example, a user may listen to music through speaker 220.

Keypad 230 may include any component capable of providing input to handset 200. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to handset 200. Function keys 240 may include a key that permits a user to cause handset 200 to perform one or more operations. The functionality associated with a key of function keys 240 may change depending on the mode of handset 200. For example, function keys 240 may perform a variety of operations, such as placing a telephone call, playing various media, setting various camera features (e.g., focus, zoom, etc.) or accessing an application. Function keys 240 may include a key that provides a cursor function and a select function.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information. Display 250 may also operate as a view finder.

Figure 3:
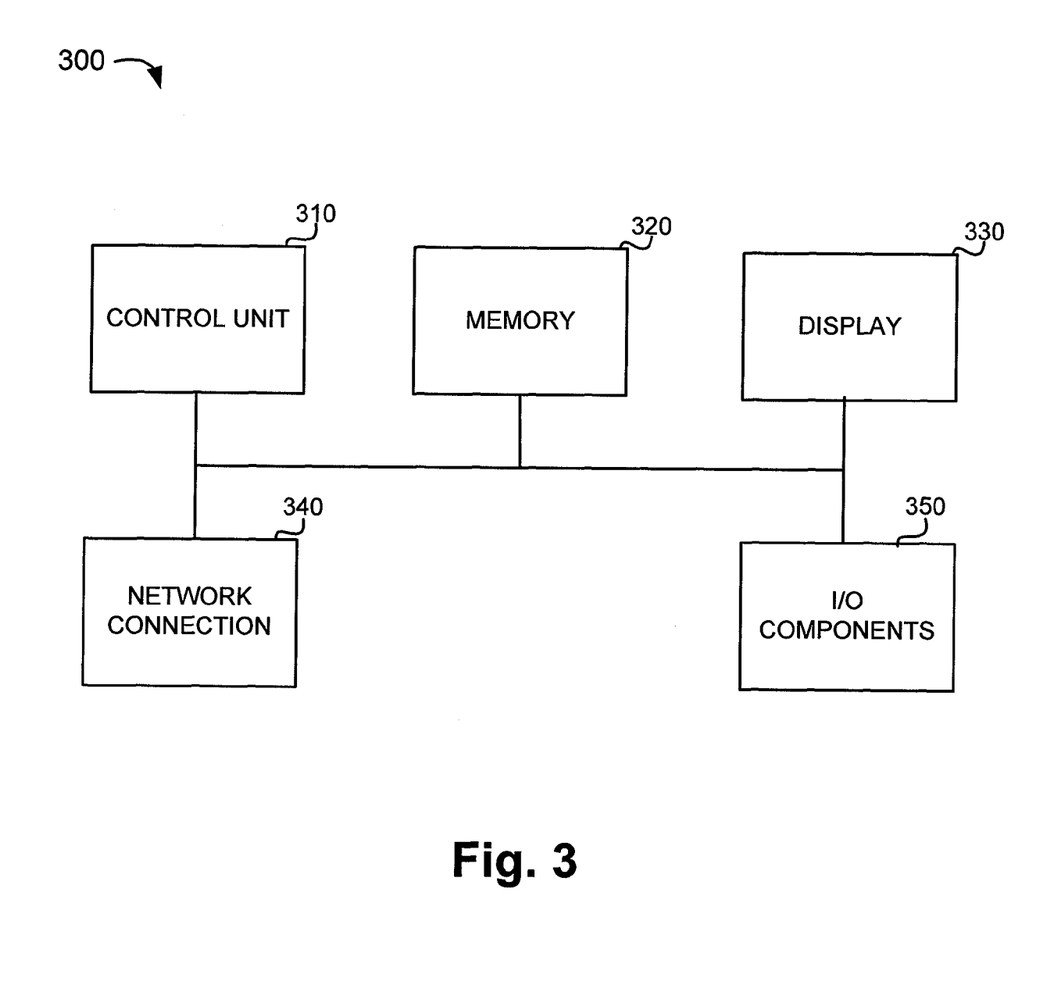
FIG. 3 is diagram illustrating exemplary components of one of the devices shown in FIG. 1.

FIG. 3 is diagram illustrating exemplary components of one the devices shown in FIG. 1, such as virtual handset server 120 or communication/computing devices 130, 140, or 150. For convenience, the exemplary components of any of these devices will be referred to as device 300 in the discussion of FIG. 3. Device 300 may include control unit 310, memory 320, display 330, network connection 340, and input/output (I/O) components 350.

Control unit 310 may include a processor, microprocessor, or other type of processing logic that may interpret and execute instructions. Memory 320 may include a dynamic or static storage device that may store information and instructions for execution by control unit 310. For example, memory 320 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 330 may include any component capable of providing visual information, such as a display 250 of a handset. For example, in one implementation, display 330 may be a liquid crystal display (LCD). In another implementation, display 330 may be any one of other display technologies, such as a plasma display panel (PDP), a field emission display (FED), a thin film transistor (TFT) display, etc. Display 330 may display, for example, text, image, and/or video information. Display 330 may be an optional component. In some implementations of device 300, such as when device 300 represents virtual handset server 120, a display may not be used.

Network connection 340 may include any transceiver-like mechanism that enables device 300 to communicate with other devices and/or systems. For example, network connection 340 may include an Ethernet interface, an optical interface, a coaxial interface, a radio interface, or the like. Network connection 340 may allow for wired, wireless, and/or optical communication.

Input/output components 350 may generally include user input devices such as external buttons, a keyboard or mouse and output devices such as a display or printer. With input/output components 350, a user may generally interact with device 300. In some implementations, such as when device 300 represents virtual handset server 120, device 300 may be a "headless" device, in which case input/output components 350 may be absent. In the context of FIG. 2, input/output components 350 may generally include microphone 210, speaker 220, keypad 230, and function keys 240.

As will be described in detail below, devices, such as devices 300, may perform certain operations relating to communications over a network. Device 300 may perform these operations in response to control unit 310 executing software instructions contained in a computer-readable medium, such as memory 320. A computer-readable medium may be defined as a physical or logical memory device.

The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

As described herein, physical handsets, such as handset 140, may receive information that defines a virtual handset. The virtual handset may particularly include personal preference and/or usage information for the user. Handset 140 may implement the virtual handset using the hardware implemented by the particular handset 140 but that presents an interface to the user designed to mimic, as much as possible, the interface and/or functionality of the virtual handset.

Figure 4:
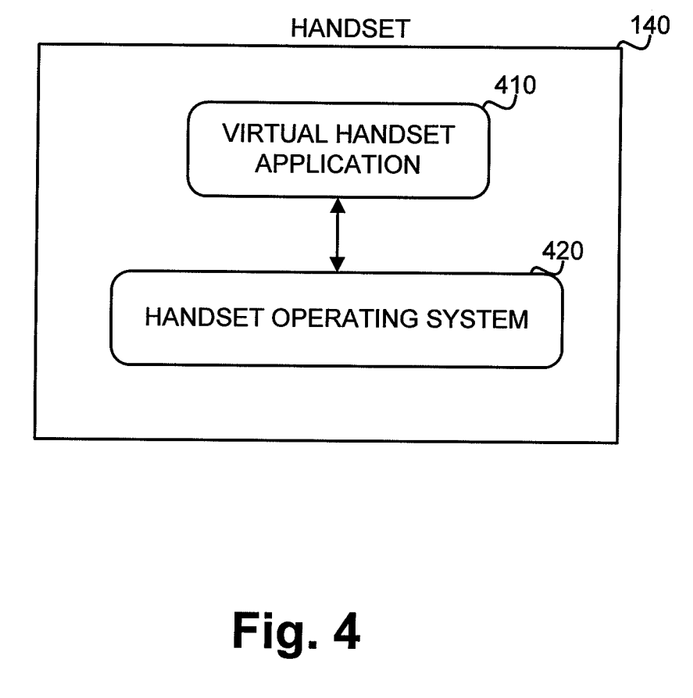
FIG. 4 is a diagram illustrating an exemplary implementation of software components of a physical handset.

FIG. 4 is a diagram illustrating an exemplary implementation of software components of a physical handset, such as handset 140. Handset 140 may include a virtual handset application 410 and a handset operating system 420. Virtual handset application 410 may, based on a received virtual handset profile, customize the interface presented to the user of handset 140. Virtual handset application 410 may, for example, present a particular visual theme on display 250, set particular ringtones for handset 140, and enable certain email settings. Virtual handset application 410 may be an application installed by the manufacturer or reseller of handset 140, or a third-party application installed by the user of handset 410.

Handset operating system 420 may be responsible for the management and coordination of the resources of handset 140. Handset operating system 420 may act as a host for virtual handset application 410. Virtual handset application 410 may interact with handset 140 to implement the virtual handset.

Figure 5:
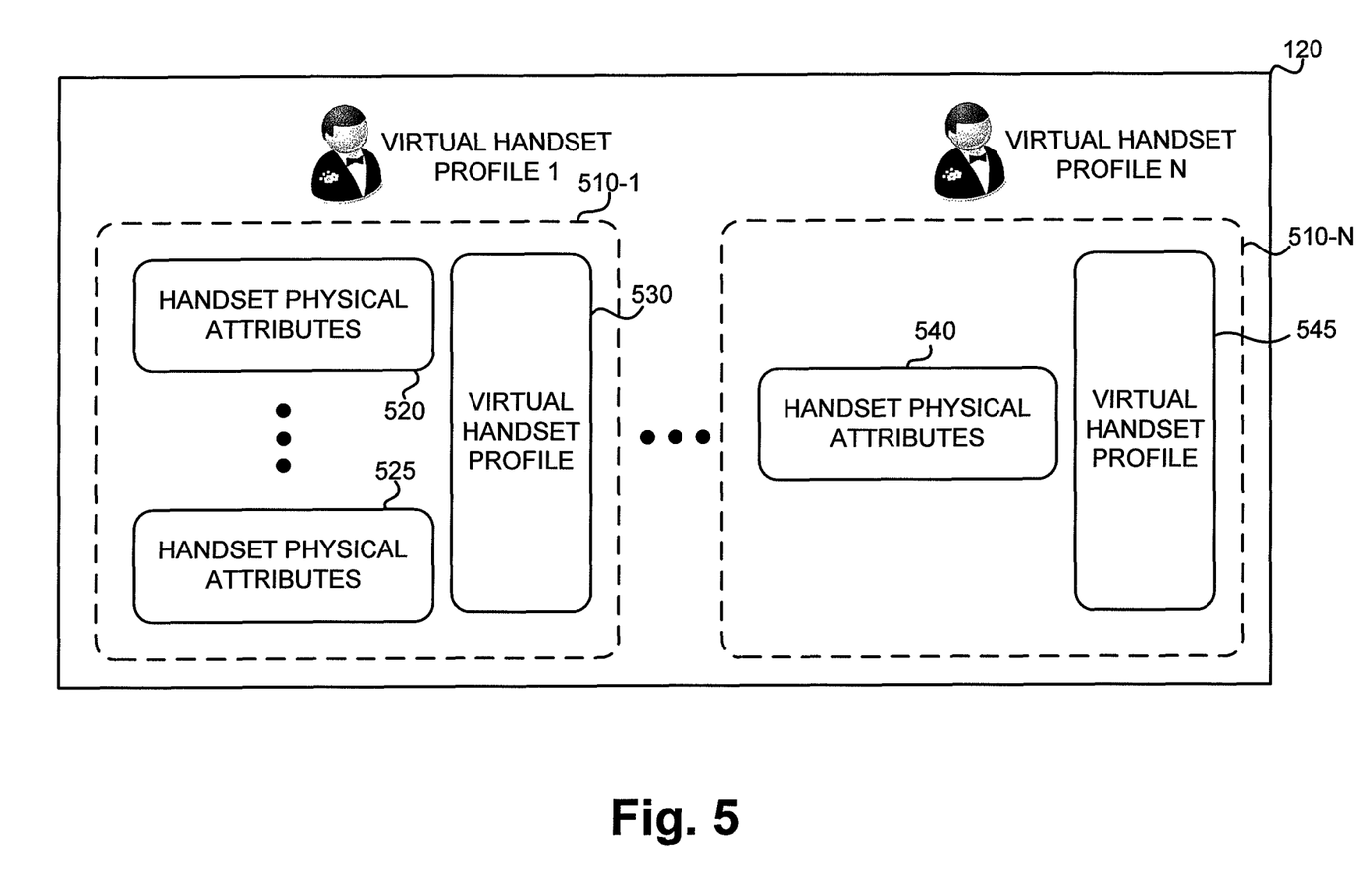
FIG. 5 is a diagram illustrating exemplary data structures stored by a virtual handset server.

Virtual handset profiles that are used by virtual handset application 410 may be stored at virtual handset server 120. FIG. 5 is a diagram illustrating exemplary virtual handset profile data structures stored by virtual handset server 120.

As shown in FIG. 5, virtual handset server 120 may store virtual handset profiles for a number of users, labeled as virtual handset 510-1 through virtual handset 510-N (collectively referred to as virtual handsets 510). Different users may be associated with different virtual handset profiles. In some implementations, a single user may be associated with multiple virtual handset profiles.

Each virtual handset may include a description of one or more handsets associated with the user and data that describes personal preference and/or usage information for the user. Virtual handset 510-1, for instance, includes two handset physical attribute blocks 520 and 525, and virtual handset profile 530. Virtual handset 510-N includes one handset physical attribute block 540 and virtual handset profile 545.

Each handset physical attribute block 520, 525, or 540 may describe the physical capabilities of a physical handset that the user has registered with virtual handset server 120. Physical attributes may include, for instance, a description of the physical properties of the handset, such as whether the handset includes a full keyboard, the size of the display, whether the handset includes a color display, email capabilities of the handset, operating system used by the handset, etc. In some implementations, each physical attribute block may be implemented as an identifier that describes a known handset by make and model.

In general, users may register as many handsets as they desire with virtual handset server 120. For example, a user signing up with a particular mobile communication service provider may initially purchase a number of handsets with the user's wireless communication plan. Each of these handsets may be automatically saved as a handset physical attribute block by the service provider.

Figure 6:
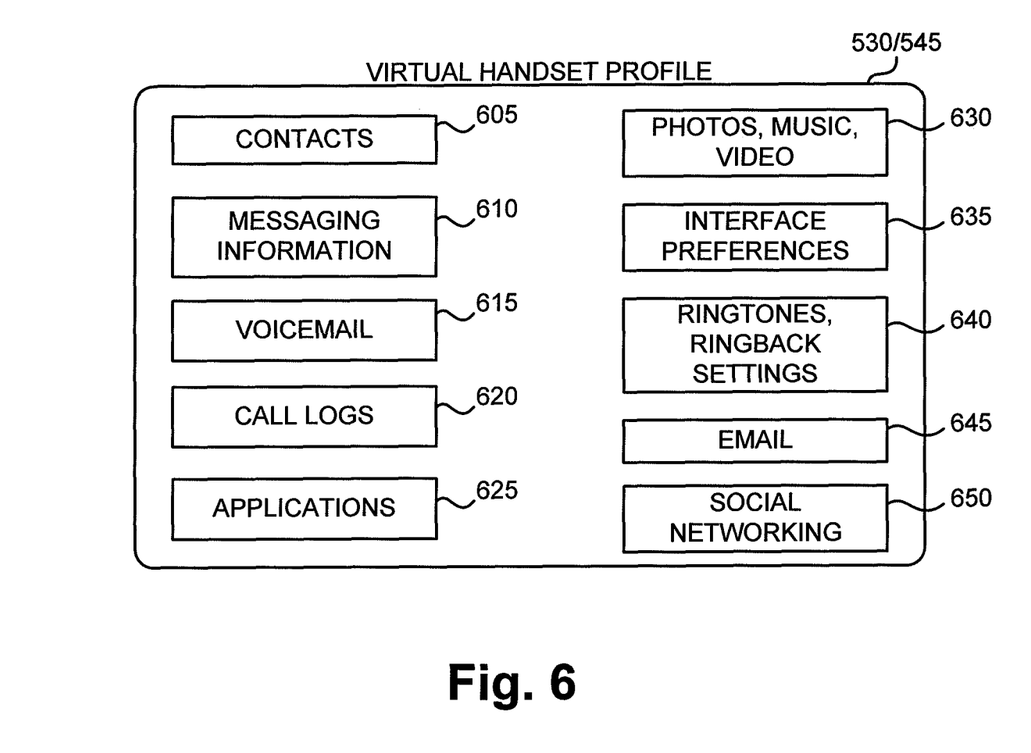
FIG. 6 is a diagram illustrating exemplary types of information that may be stored in virtual handset profiles.

FIG. 6 is a diagram illustrating exemplary types of information that may be stored in virtual handset profiles 530 and 545. The virtual handset profiles may each include, one or more of, without limitation: contacts 605; messaging information 610; voicemail information 615; call logs 620; applications 625; photos, music, and/or videos 630; interface preferences 635; ringtones or ringback settings 640, email information 645, and social networking preferences 650. More generally, any handset preference information or data related to the user may be included in virtual handset profile 530/545. In other words, a virtual handset profile may generally store everything (or everything the user chooses to store) about the user or their handset, Ideally, virtual handset profile 530/545 may define a complete virtual handset as customized by the user. User profile 530/545 may then be used to dynamically customize an arbitrary physical handset.

Contacts 605 may include information relating to stored contacts of the user. Contacts may include a list of people or businesses that the user has previously stored. The list may include, for each entry, one or more of, the contact's phone number, postal address, email address, or fax address.

Messaging information 610 may relate to instant messaging services used by the user. Messaging information 610 may include, for example, instant message contacts, login information for different instant messaging services, and a history of previously sent or received messages.

Voicemail information 615 may include information describing voicemail services and/or a stored history of previously received voicemails. Voicemail information 615 may, for example, include telephone numbers and login information required to access an external voicemail service. Additionally, voicemail information 615 may include a stored history of previously listened-to voicemails.

Call logs 620 may include stored logs relating to previous incoming or outgoing calls. Each time the user of the handset makes or receives a call, the number called or the number of the calling party may be added to call logs 620. In this manner, a user can potentially browse a history of previous calls.

Applications 625 may include copies of certain applications for the handset. Some handsets allow users to install applications, such as third-party applications designed to enhance the functionality of the handset. Applications installed by a user may be stored in the virtual handset profile and later downloaded to handsets capable of supporting the application.

Photos, music, and/or videos 630 may include any photographs, videos, or music that the user has added to their handset.

Interface preferences 635 may include information relating to the interface presented by the handset to the user. For example, certain handsets may allow the user to customize interface settings such as the font, color scheme, speed dial settings, or background images shown on display 250. Interface preferences 635 may store this information to potentially present a consistent visual interface to a user across different physical handsets.

Ringtones and ringback settings 640 may store customized ringtones (tones played when a user receives a call) or ringback sounds (the audible ringing that is heard on the telephone line by the calling party after dialing and prior to the call being answered at the receiving end) for a handset.

Email information 645 may include information describing email services and/or a stored history of previously received or sent emails. Email information 645 may, for example, include login or other account information for one or more email services to which the user subscribes. Email information may additionally include a history of emails that have been sent or received by the user.

Social networking information 650 may include information relating to social networking services that the user visits. Social networking information 650 may include, for example, user account information, social network contact information, and messages received or sent through the social networking services.

Figure 7:
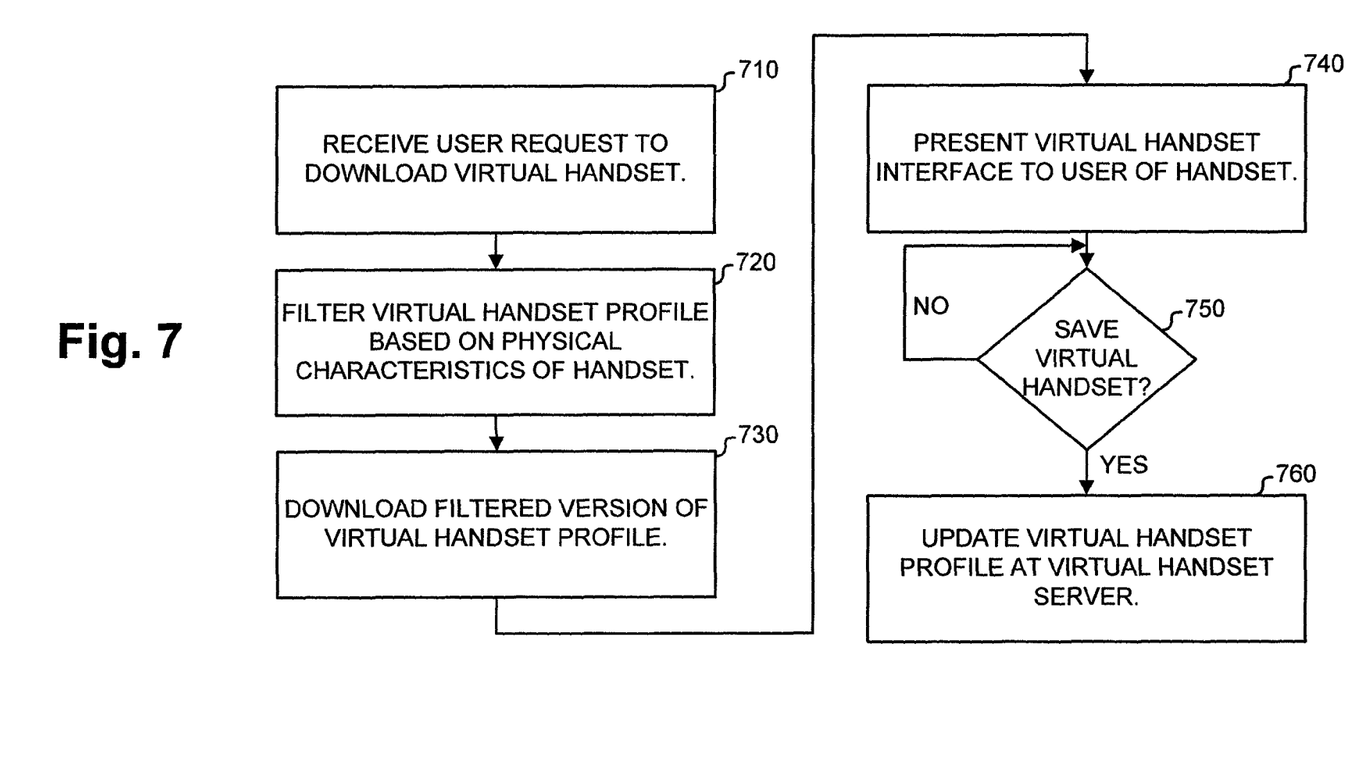
FIGS. 7 and 8 are flow charts illustrating exemplary operations consistent with the implementation of a virtual handset based on a virtual handset profile.

FIG. 7 is a flow chart illustrating exemplary operations consistent with the implementation of a virtual handset based on a virtual handset profile according to a first exemplary embodiment.

A user of a handset, such as handset 140, may, at some point, request that the "normal" interface of the handset be replaced with a virtual handset, such as the one defined by virtual handset profile 530. This may happen, for instance, automatically whenever handset 140 is turned on or in response to a specific user request to download the user's virtual handset from virtual handset server 120 (block 710). In implementations in which a user maintains multiple virtual handsets, the user may also indicate which virtual handset profile they would like to use. Additionally, during the request to download a virtual handset, the user may authenticate his/her identity with virtual handset server 120. The authentication may be automatically, such as by using an the telephone number of another identification number that is assigned to the physical handset, or the authentication may be performed by requesting that the user explicitly enter a password or other authentication information.

Virtual handset profile 530, as requested by the user, may be filtered by virtual handset server 120 based on the handset physical attribute block that corresponds to the handset that the user is currently using (block 720). The filtering may particularly include removing portions of the profile that cannot be implemented by the physical handset. For example, virtual handset profile 530 may include applications that are not compatible with physical handset or interface preferences that are not supported by the physical handset. Virtual handset server 120 may perform this filtering based on a comparison of the appropriate handset physical attributes 520 with virtual handset profile 530.

The filtered version of the virtual handset profile may then be downloaded to the physical handset (block 730). In some implementations, only the portions of virtual handset profile 530 that has changed since the last download may be downloaded. Virtual handset application 410 may receive and process virtual handset profile 530. Virtual handset application 410 may then operate in conjunction with handset operating system 420 to present the downloaded virtual handset to the user (block 740). In other words, the physical handset should ideally, to the extent possible based on the physical attributes of the physical handset, provide a customized interface that includes the personal preference and usage information defined by virtual handset profile 530.

During use of the handset, the user may make changes to the handset preference and usage information. For example, the user may receive email, change the screensaver image, upload music files, take a picture, etc. The user may be given the option to, when desired, update or save the virtual handset profile based on the current state of the user's physical handset (block 750). In some implementations, instead of requiring the user to explicitly choose to update their virtual handset profile, the virtual handset profile may be updated automatically, such as at period intervals or when the handset is shut off. In either situation, the virtual handset profile may be updated at virtual handset server 120 (block 760), by, for example, uploading, to virtual handset server 120, any changes at the physical handset that are relevant to the virtual handset profile.

Figure 8:
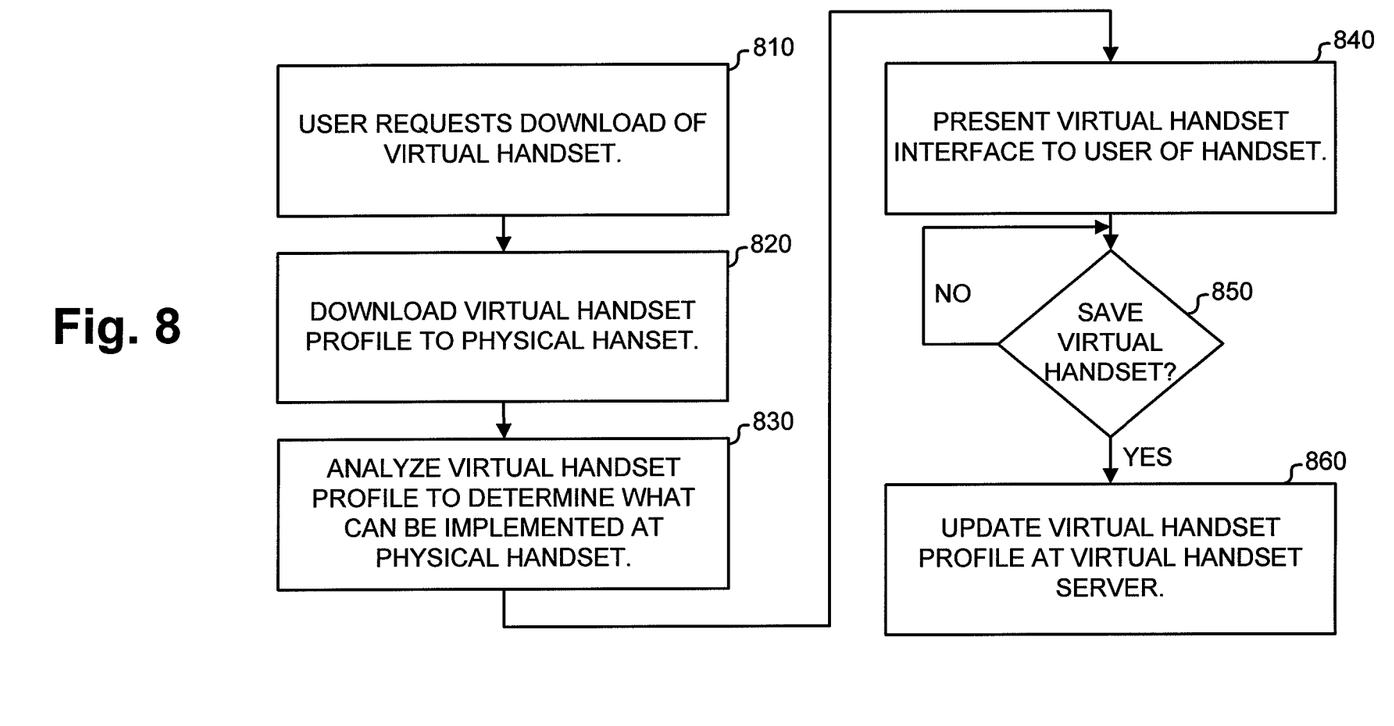

FIG. 8 is a flow chart illustrating exemplary operations consistent with the implementation of a virtual handset based on a virtual handset profile, according to a second exemplary embodiment. In the operations shown in FIG. 7, virtual handset profile 530 was filtered, at virtual handset server, into a form appropriate for the target physical handset. In the embodiment shown in FIG. 8, instead of filtering the virtual handset profile at virtual handset server 120, virtual handset application 410 may determine the appropriate portions of the virtual handset profile to implement. In this embodiment, the handset physical attribute (e.g., handset physical attribute blocks 520, 525, and 540) blocks may not need to be stored at virtual handset server 120.

The user of a handset 140, may, at some point, request that the "normal" interface of the handset be replaced with a virtual handset, such as the one defined by virtual handset profile 530. This may happen, for instance, automatically whenever handset 140 is turned on or in response to a specific user request to download the user's virtual handset (block 810).

The requested virtual handset profile 530 may then be downloaded to the physical handset (block 820). In some implementations, only the portions of virtual handset profile 530 that has changed since the last download may be downloaded. Virtual handset application 410 may receive and process virtual handset profile 530. The processing may include analyzing virtual handset profile 530 to determine which portions of the profile can be implemented on the physical handset (block 830). Virtual handset application 410 may, for instance, determine what hardware is required to implement the various features defined in the virtual handset profile. Those that cannot be implemented by the physical handset may be ignored by virtual handset application 410.

Virtual handset application 410 may then operate in conjunction with handset operating system 420 to present the downloaded virtual handset to the user (block 840). In other words, the physical handset should ideally, to the extent possible based on the physical attributes of the physical handset, provide a customized interface that includes the personal preference and usage information defined by virtual handset profile 530.

During use of the handset, the user may make changes to the handset preference and usage information. The user may be given the option to, when desired, update or save the virtual handset profile based on the current state of the user's physical handset (block 850). In some implementations, instead of requiring the user to explicitly choose to update their virtual handset profile, the virtual handset profile may be updated automatically, such as at period intervals or when the handset is shut off. In either situation, the virtual handset profile may be updated at virtual handset server 120 (block 860), by, for example, uploading, to virtual handset server 120, any changes at the physical handset that are relevant to the virtual handset profile.

In addition to the implementations described in FIGS. 7 and 8, it can be appreciated that other techniques may be used to determine the portions of a virtual handset profile that are to be implemented on a particular physical handset. For instance, instead of storing handset physical attribute blocks at virtual handset server 120, the physical handset may, on a per-connection basis, inform virtual handset server 120 of its physical capabilities. Virtual handset server 120 may then appropriately filter and transmit a virtual handset profile to the physical handset.

In addition to customizing the interface presented by the physical handset to the user, the user may desire that a virtual handset profile be associated with a single phone number. In other words, calls to this number may always be routed to the physical handset that is currently implementing the virtual handset profile. In one possible implementation, the physical handset may setup, when the physical handset is running a virtual handset profile, call routing in network 110 using the number associated with the virtual handset profile. The physical handset may similarly disable call routing when the physical handset is turned off or the user decides to stop using the virtual handset. Alternatively, virtual handset server 120 may setup and disable the call routing.

Other techniques for routing calls between physical handsets could be implemented. For example, virtual handset profile 530 may include routing information that is used to prioritize how calls are routed to devices. For example, a user may have two physical handsets active and running the same virtual handset. Virtual handset server 120 may use the routing information to determine which of the two physical handsets should receive calls. Additionally, virtual handset server 120 may user device presence information (i.e., whether a device is "on" or present in the network) to automatically adjust call routings based on the routing information and presence information. In some implementations, as described in more detail below, personal computers or other devices may be used to host a virtual handset. These devices may also be included in the devices that virtual handset server 120 collects presence information from and to which virtual handset server 120 routes calls.

A user may desire to access their virtual handset or certain data stored on their virtual handset through an interface other than a physical handset. In some implementations, some or all of the data in a virtual handset profile may be accessed through an interface other than a physical handset.

Figure 9:
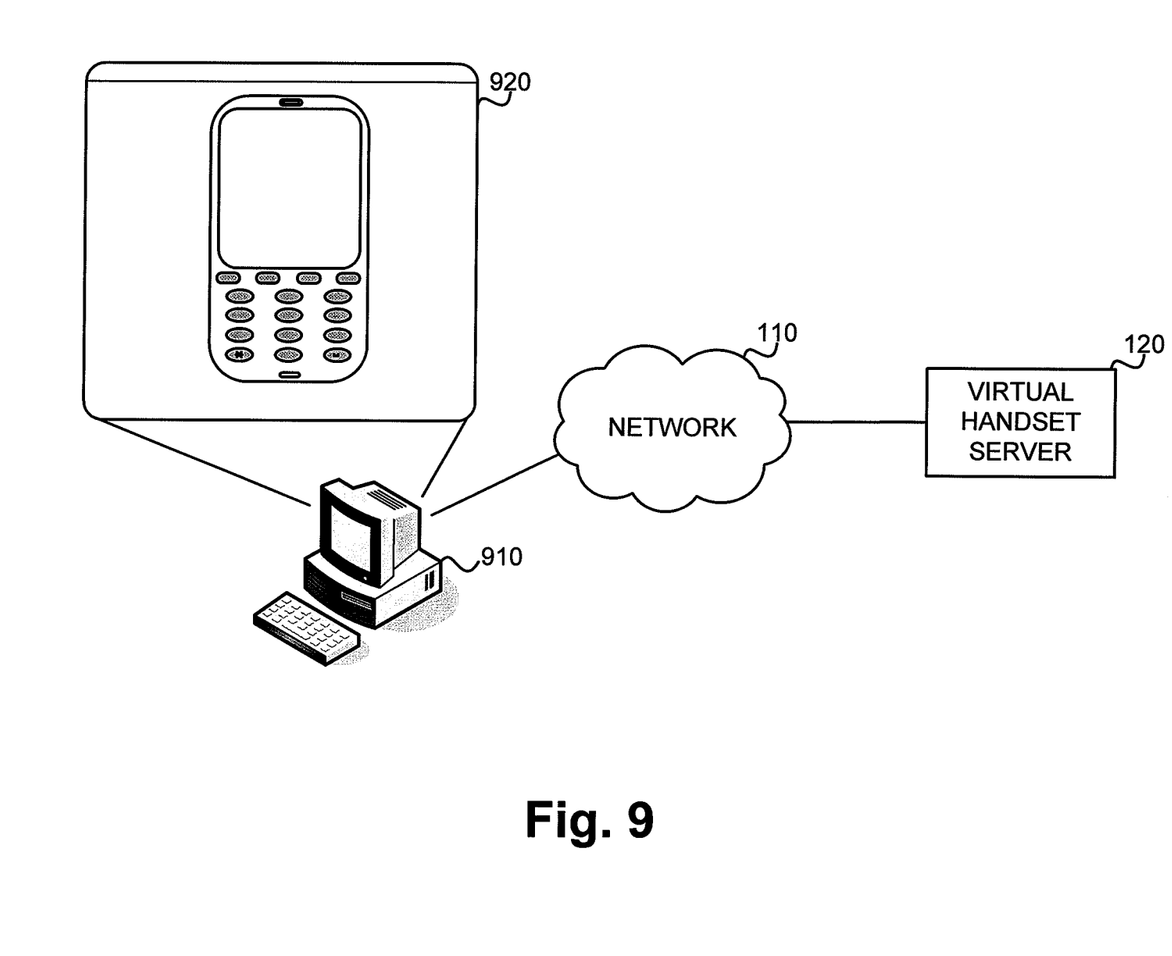
FIG. 9 is a diagram illustrating access of a virtual handset profile through a personal computer.

FIG. 9 is a diagram illustrating access of a virtual handset profile through a personal computer. As shown in FIG. 9, a personal computer 910 may connect through network 110 to virtual handset server 120. In some situations, a user may desire to "use" some or all of the features of a virtual handset through an interface other than an actual physical handset. As shown in FIG. 9, personal computer 910 may download a virtual handset profile and implement, in software, an interface to the data and/or functionality of the virtual handset defined by the virtual handset profile. As shown in the example of FIG. 9, a graphical interface 920 may present a graphical representation of a handset that allows the user to interact with a virtual handset. Through graphical interface 920, a user may view data or other personal information stored as part of the virtual handset profile. Additionally, in some implementations, the user may place and receive telephone calls, which may be implemented by personal computer 910.

Graphical interface 920 may be implemented by an application executing on personal computer 910. Alternatively, virtual handset server 120 may allow users to connect to virtual handsets through, for example, a web interface. In this situation, users may view virtual handset profiles via a web browser that connects to virtual handset server 120. For example, a user may arrive at work and realize he forgot his physical handset. The user, via a web interface that connects to virtual handset server 120, interact with a virtual version of this handset that provides him with many or all of the actions he can perform from his physical handset.

It can be appreciated that computing devices other than a personal computer, such as a laptop, television set-top box, video game console, or other computing device may similarly be used to access a virtual handset profile.

Additionally, some implementations may allow for users to share virtual handsets, or portions of virtual handsets, between users. For example, a user may designate that certain portions of a virtual handset profile as "public," which may allow other users to download and implement the public portion of the virtual handset profile.

As described above, a virtual handset may be downloaded and implemented at an arbitrary physical handset to conveniently provide the user with a personalized handset. A virtual handset may allow users to easily switch between physical handsets. Users could, for instance, own multiple handsets without having to manually keep their personal preference and usage information synchronized between the two. Providing virtual handset profiles over a network may be useful when the user would like to rent a handset (for example, when traveling and the user forgets their handset), purchase a disposable handset (e.g., from a vending machine that dispenses "blank" handsets), borrow a handset from a friend, etc.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks and/or acts have been described with regard to processes illustrated in FIGS. 7 and 8, the order of the acts and/or messages may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing, by a device, a profile that defines personal preference and usage information for a virtual handset associated with a user, the profile including a plurality of portions;
    identifying, by the device and from a physical handset of the user, physical characteristics of the physical handset based on a request for the profile;
    comparing, by the device, the physical characteristics with the profile;
    filtering, by the device and based on comparing the physical characteristics with the profile, the profile to obtain a filtered profile that includes one or more portions of the plurality of portions,
        filtering the profile including removing at least one portion, of the plurality of portions, that is not compatible with the physical handset to obtain the filtered profile,
        the one or more portions being less than the plurality of portions, and
        the one or more portions including at least one of:
            information relating to one or more call services associated with the user,
            information relating to one or more instant messaging services associated with the user, or
            information relating to one or more voicemail services associated with the user; and
    downloading, by the device, the filtered profile to the physical handset for implementation of the virtual handset at the physical handset to present the one or more portions to the user.

2. The method of claim 1, where the one or more portions, of the profile, further include information relating to interface preferences for the virtual handset and user data associated with the virtual handset.

3. The method of claim 1, where the one or more portions, of the profile, further include information relating to applications installed by the user.

4. The method of claim 1, further comprising:
    receiving changes to the one or more portions of the profile based on changes, made by the user via the physical handset, that relate to the one or more portions, while the physical handset is implementing a user interface corresponding to the virtual handset; and
    updating the one or more portions of the profile based on the received changes to the one or more portions of the profile.

5. The method of claim 1, further comprising:
    downloading one or more different portions of the profile to a second physical handset for implementation of a user interface corresponding to the virtual handset at the second physical handset
    where the user interface includes information associated with the one or more different portions, and
    where the one or more different portions are based on physical characteristics of the second physical handset that are different than the physical characteristics of the physical handset.

6. The method of claim 1, further comprising:
storing a plurality of profiles that define personal preference and usage information for a plurality of virtual handsets; and
receiving a selection, from the user, of the profile from the plurality of profiles,
where the request is based on the selection of the profile.

7. The method of claim 1, further comprising:
receiving, from the user, a telephone number to be associated with the virtual handset;
associating the telephone number with the virtual handset; and
enabling routing of telephone calls, directed to the telephone number associated with the virtual handset, to the physical handset.

8. A system comprising:
a memory to store instructions; and
one or more processors to:
store a profile that is associated with a virtual device of a user,
identify physical characteristics of a physical device of the user based on a request, from the physical device, for the profile,
compare the physical characteristics with the profile,
filter, based on comparing the physical characteristics with the profile, the profile to obtain a filtered profile that is different than the profile,
when filtering the profile, the one or more processors are to remove at least one portion, of a plurality of portions of the profile, that is not compatible with the physical device to obtain the filtered profile,
the filtered profile including information, from a plurality of physical devices of the user, relating to at least one of:
one or more calls associated with the plurality of physical devices,
one or more communication services associated with the plurality of physical devices, or
one or more social networking services associated with the plurality of physical devices, and
download the filtered profile to a physical device for implementation of the virtual device, based on the filtered profile, at the physical handset.

9. The system of claim 8, where the filtered profile further includes information relating to interface preferences for the virtual device and user data associated with the virtual device.

10. The system of claim 8, where the filtered profile further includes information relating to applications installed, by the user, on the plurality of physical devices of the user.

11. The system of claim 8, where the one or more processors are further to:
store a plurality of profiles associated with a plurality of virtual devices, and
detect selection, from the user, of one of the plurality of profiles,
where the selected one of the profiles correspond to the profile that is associated with the virtual device of the user.

12. A method comprising:
receiving, at a physical device of a user, a profile, for a virtual device, that includes a plurality of portions;
analyzing, by the physical device, the profile to determine one or more portions, of the plurality of portions of the profile, to be implemented at the physical device,
the one or more portions being determined based on a comparison of physical characteristics of the physical device with the profile,
analyzing the profile including removing at least one portion, of the plurality of portions, that is not compatible with the physical device to obtain the filtered profile, and
the one or more portions including information relating to at least one of:
one or more calls associated with the user,
one or more communication services associated with the user, or
one or more social networking services associated with the user; and
presenting, by the physical device, an interface that implements the virtual device,
the interface including information associated with the one or more portions.

13. The method of claim 12, where the profile is received, via a network, from a server that stores information identifying a plurality of virtual devices for a plurality of different users.

14. The method of claim 12, where the one or more portions further include information relating to graphical interface preferences for the virtual device.

15. The method of claim 12, where the one or more portions further include information relating to applications installed on one or more physical devices of the user.

16. The method of claim 12, further comprising:
uploading changes to the profile based on changes made by a user at the physical device while the interface is presented.

17. The method of claim 12, further comprising:
receiving, by the physical device, telephone calls directed to a telephone number associated with the virtual device.

18. A method comprising:
receiving, by a device, a profile that defines a virtual device of a user, the profile including a plurality of portions;
comparing, by the device, physical characteristics, of one of a plurality of physical computing devices, with the profile;
filtering the profile, by the device and based on comparing the physical characteristics with the profile, to obtain a filtered profile that includes one or more portions, of the plurality of portions, that match the physical characteristics,
filtering the profile including removing at least one portion, of the plurality of portions, that does not match the physical characteristics,
the one or more portions being less than the plurality of portions, and
the one or more portions including at least one of:
information relating to one or more communication services associated with the user, or
information relating to one or more social networking services associated with the user; and
downloading, by the device, the filtered profile to the one of the plurality of physical computing devices to present, to the user, an interface, for the virtual device, that includes information associated with the one or more portions.

19. The method of claim 18, where the one of the plurality of physical computing devices includes a mobile communication handset.

20. The method of claim 18, where the one of the plurality of compatible physical computing devices includes a personal computer, a set-top box, or a video game console.

21. The method of claim 18, further comprising:
receiving changes to the one or more portions of the profile based on changes, made by the user via the one of the plurality of computing physical devices, that relate to the one or more portions, while the one of the plurality of computing physical devices is implementing the interface for the virtual device; and causing the one or more portions of the profile to be updated based on the received changes to the one or more portions of the profile.

22. The method of claim 18, further comprising:

enabling routing of telephone calls, directed to a telephone number associated with the virtual device, to the one of the plurality of compatible physical devices.

\* \* \* \* \*